Sept. 12, 1933. E. E. GREVE Re. 18,947
CONTROL MECHANISM FOR ROTARY DRILLING APPARATUS
Original Filed Feb. 21, 1929 2 Sheets-Sheet 1
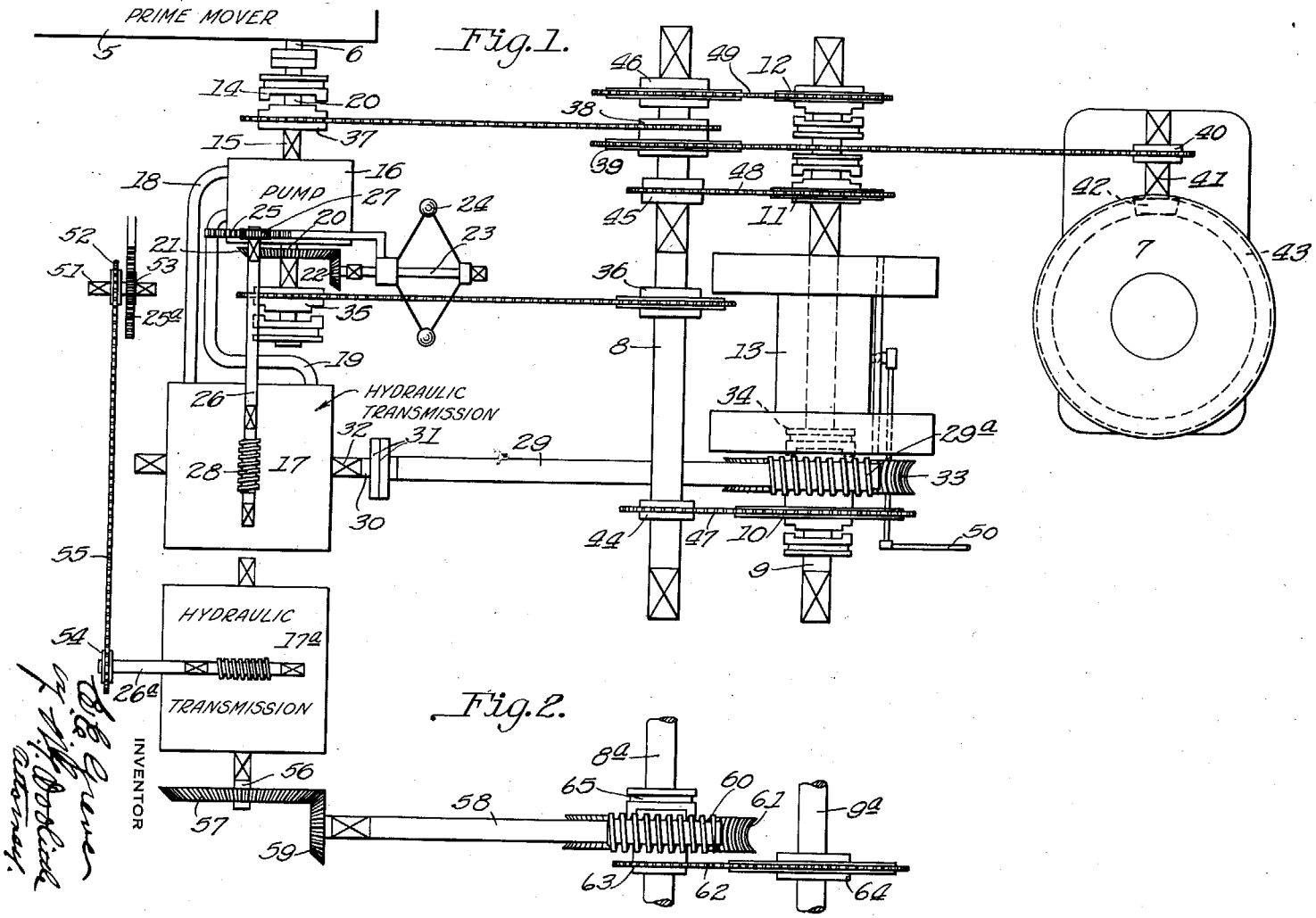

Sept. 12, 1933. E. E. GREVE Re. 18,947
CONTROL MECHANISM FOR ROTARY DRILLING APPARATUS
Original Filed Feb. 21, 1929 2 Sheets-Sheet 2
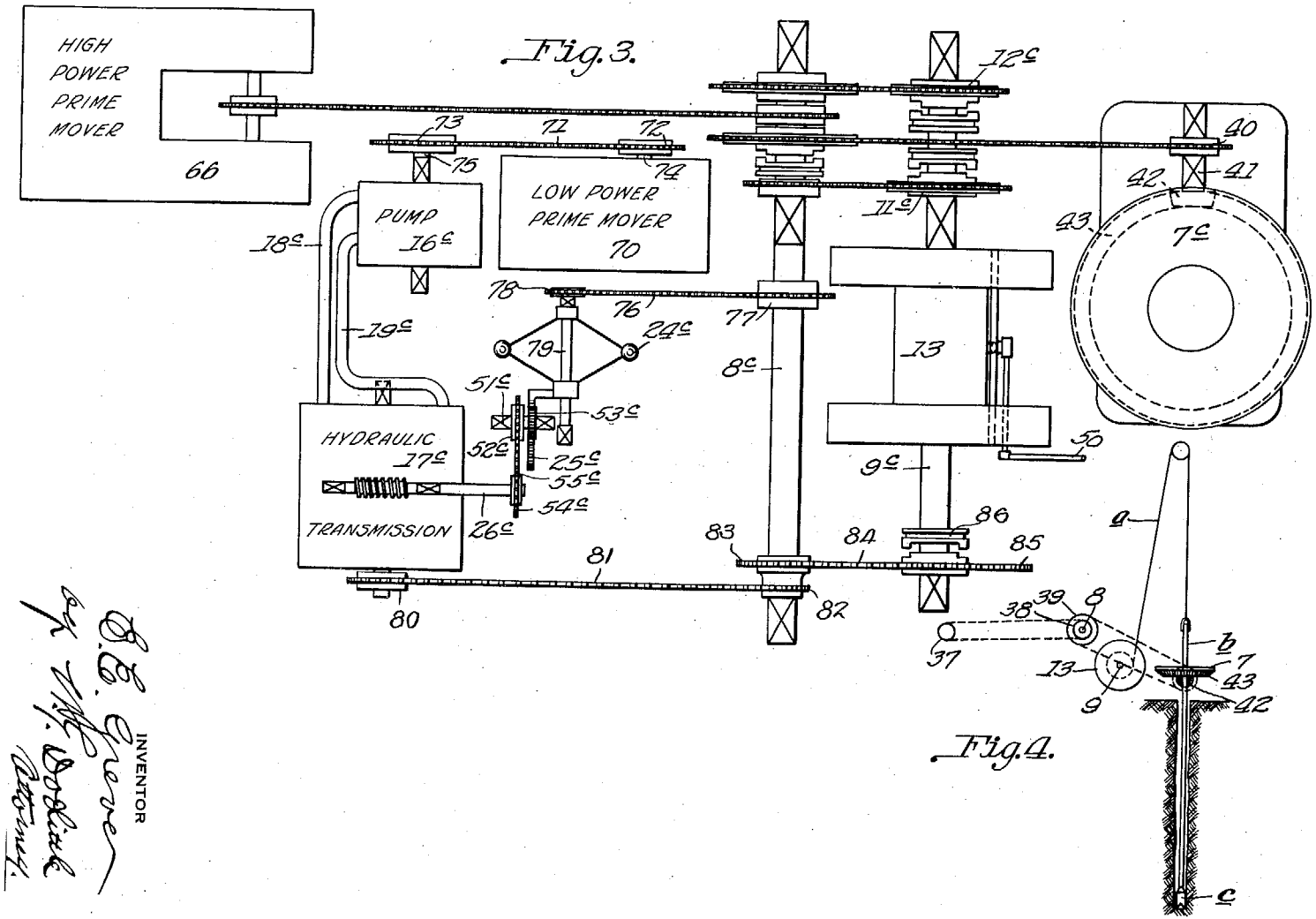
INVENTOR
E. E. Greve
by V. F. Doblick
Attorney.

Reissued Sept. 12, 1933 Re. 18,947

UNITED STATES PATENT OFFICE 18,947

CONTROL MECHANISM FOR ROTARY DRILLING APPARATUS

Edgar E. Greve, Dallas, Tex., assignor, by mesne assignments, to Oil Well Supply Company, Pittsburgh, Pa., a corporation of New Jersey Original No. 1,785,257, dated December 16, 1930, Serial No. 341,665, February 21, 1929. Application for reissue August 11, 1932. Serial No. 628,435

11 Claims. (Cl. 255—19)

This invention relates to an automatic control mechanism designed to be associated with or incorporated in rotary drilling apparatus.

The prime object of the present invention is to provide a new and improved drilling control mechanism for use in connection with rotary drilling apparatus, whereby the feed of the bit is governed while maintaining a uniform torque applied to the drill stem.

Other objects are to provide an automatic feed of the bit; a regulation of the weight or pressure on the bit during drilling operation in accordance with the variation in the resistance to the rotation of the drill bit; to provide new and improved control mechanism including a governor; means associated with the prime mover of the drilling apparatus including a hydraulic transmission, the operation of which is controlled by a governor; and new and improved driving means connecting the hydraulic transmission and the line and drum shafts of the drilling apparatus.

In the accompanying drawings which illustrate applications of my invention:

Fig. 1 is a diagrammatic plan view of drilling apparatus, particularly showing the power transmitting mechanism embodying my invention.

Fig. 2, a similar fragmentary view showing a modified power transmission mechanism, with the hydraulic transmission arranged at an angle of ninety degrees to that shown by Fig. 1.

Fig. 3, a view similar to Fig. 1, showing a still further modified construction; and Fig. 4, a detail elevational view showing a rotary table and means for suspending a drill.

Referring first to the form of Fig. 1, 5 designates a prime mover which may comprise an engine or motor of any desired type commonly used in the oil fields. This prime mover is designed through its shaft 6 to drive a rotary table 7 through the draw-works of the drilling apparatus. It is further designed to drive the hoist or drum to which the drill stem is connected by a rope or cable in the usual or any preferred manner.

As illustrated, the draw-works includes a line shaft 8 and a drum shaft 9, the latter having disposed thereon three speed means, indicated by the numerals 10, 11 and 12. As shown, 10 is the lowest speed, 11 the second speed, and 12 the third speed effecting means. It will be understood that the said speed means, including as they do clutch members, clutch member operating means, sprockets, etc., are of the usual construction. In addition to the parts just referred to, shaft 9 has a hoist drum 13 mounted thereon to carry and actuate a rope *a* leading therefrom to a drill stem *b* carrying a drill bit *c* (see Fig. 4).

In the embodiments of my invention as illustrated, I have shown several different arrangements for operating the line and drum shafts of the draw-works from the shaft 6 during the drilling operation, and these different constructions will be more fully hereinafter described.

Associated with the shaft 6, which is provided with a clutch member 14 and has an end thereof supported in a bearing 15, I employ a hydraulic transmission mechanism comprising a pump 16 and the transmission proper 17 in communication with the pump through suction and discharge pipes 18 and 19 respectively.

There are several forms of hydraulic transmission mechanism that may be advantageously employed in connection with my invention. As shown, I employ a transmission mechanism fully described and illustrated in reissue Letters Patent No. 14,187 of August 29, 1916 to Herman Dock; and as this mechanism per se is not a part of the present invention, I have deemed it unnecessary to describe the same in detail. As embodied in the present invention, the pump 16 is designed to be driven by the shaft 6 and to effect this drive the pump shaft 20 of pump 16 is coupled to shaft 6 in the bearing 15.

The control mechanism of my invention, as shown in the form of Fig. 1, is designed to be incorporated with the hydraulic transmission, and for this purpose, I provide a bevel gear 21 fixedly mounted on an end of the pump shaft 20. The control mechanism includes, as an essential and characteristic feature of the present invention, a ball governor device in operative engagement with the bevel gear 21 by a pinion 22 carried on an end of a shaft 23 of the vertically disposed ball governor device 24, the latter including a toothed rack 25.

Extending from the hydraulic transmission proper to the rack 25, I provide a shaft 26 having at one end thereof a small gear 27 designed to engage the rack 25 of the governor device and formed near its opposite end with a worm 28 in operative engagement with the port plate or plates of the transmission mechanism, whereby said plate with its ports is moved into the desired operative positions.

In the form under consideration, it is my intention during the drilling operation to revolve the drum shaft 9 to effect the desired feed of the drill bit through the hydraulic transmission mechanism and, for this purpose, I provide an automatic operable worm feed shaft 29 connected with a stub shaft 30 of the transmission. As shown, these shafts are connected by collars 31; and 32 designates a bearing for the shafts. Designed to co-operate with the worm 29*a* of the shaft 29 is a worm wheel 33 mounted on the shaft 9; said shaft also has mounted thereon a worm wheel clutch 34.

While the rotation of line shaft 8, during the hoisting and lowering of the drill stem from and into operative position in a well, may be effected in different ways, in the form of Fig. 1 I employ a chain drive extending from a sprocket 35, mounted on the pump shaft 20, to a fixed sprocket 36 carried by the said line shaft. The sprocket 35 is engageable by a clutch member associated therewith.

In this form of my invention, the rotary table 7 is driven from the main power shaft by a chain drive, and for this purpose I employ a sprocket 37 freely mounted on the shaft 20 and engageable by the clutch member 14, a sprocket 38, and a sprocket 39 secured to a common hub and free to rotate on line shaft 8, and a fixed sprocket 40 carried on a shaft 41 leading to the rotary table. Shaft 41 carries a pinion 42 designed to co-operate with a gear 43 on the rotary table, through which the drill stem or tubing extends.

It will, of course, be understood that provision must be made for connecting the three speed means 10, 11 and 12 with the line shaft for the purpose of driving the drum shaft at the desired speed and, as shown, I have provided sprocket or gear wheels 44, 45 and 46 and chains 47, 48 and 49 extending therefrom to the said means 10, 11 and 12. All of these last mentioned parts are of the usual construction employed in rotary well drilling apparatus.

In the operation of drilling, the drill string is lowered into the well by operating the prime mover 5, sprockets 35 and 36, drum shaft 9, and the cable drum 13, the speed of the drum 13 being regulated by any of the speed means 10, 11 and 12 described. The sprocket 35 is then disengaged by means of its clutch member, and the clutch member 14 on the prime mover shaft 6 is moved to engage the sprocket 37 for driving the rotary 7 through the medium of chains engaging the sprockets 38, 39 and 40.

It will be seen that the drum shaft 9 is no longer driven from the line shaft 8, but is operated by means of the hydraulic transmission 17 and its associated parts for regulating the rate of feed of the drill bit in the following manner.

The pump 16 supplies fluid to drive the hydraulic transmission, the latter being of well known construction, as hereinbefore stated, and comprising a series of port plates (not shown), the relative positions of which determine the direction of flow of the fluid therethrough, thereby regulating and controlling the speed and direction of rotation of the transmission. The governor device 24 together with worm 28 and their associated parts, operate to change the relative positions of the port plates of the hydraulic transmission to control the speed and direction of rotation of the drum shaft 9, as a function of the speed of the rotary table.

The rate of feed of the drill bit is fixed in accordance with the rotary speed by manipulating the hand brake lever 50 on the hoist drum or shaft in the usual manner. Upon the determination of the rotary and feeding speeds, the port plates of the hydraulic transmission will be adjusted thereto, to give the required rate of feed by means of the shaft 29, gearing 29*a*, 33, clutch member 34, shaft 9 and the cable drum 13.

Should the speed of the rotary be decreased, due to torsional resistance encountered by the drill bit, the prime mover 5 will be momentarily retarded, thereby changing the governor position which, in turn, will move the port plates of the transmission to the required position for retarding the rotation of the drum 13, decreasing the rate of feed of the drill bit. When the resistance encountered becomes so great as to cause the drill bit to stick, the retardation effected will move the port plates of the transmission by means of the governor mechanism, to the required position for reversing the direction of rotation of the drum 13, thereby raising the drill bit and releasing the same from said resistance.

In the form of Fig. 2, which shows the transmission proper 17*a* and some of the associated parts arranged at an angle of ninety degrees to the view of Fig. 1, I have shown a modified construction, particularly showing a different method of driving the line and drum shafts, and a slightly different connection between the governing device and the transmission proper.

In this form I have provided a jack shaft 51 mounted in suitable bearings disposed adjacent the governor device, or particularly the rack portion 25*a* thereof, and have mounted on shaft 51 a sprocket 52 and a pinion 53, the latter being designed to cooperate with the rack 25*a*. In this form, shaft 26*a* is provided with a sprocket 54 over which a chain 55 extends and is led over sprocket 52. Line shaft 8*a* is designed to be driven during the drilling operation through the transmission, and for this purpose I provide a stub shaft 56 carrying a large gear 57, a worm shaft 58 having a pinion 59 meshing with gear 57, and a worm 60 arranged in co-operation with a worm wheel 61 freely mounted on line shaft 8*a*. In this instance, the hoist or drum shaft 9*a* is driven by a chain drive 62 operating over sprockets 63 and 64 respectively, mounted on the said line and drum shafts. 65 designates a worm wheel clutch.

In the form of my invention as illustrated by Fig. 3, I have shown what may be termed an independent control unit, in the sense that I employ an independent prime mover for driving the automatically operable control mechanism.

In this form of my invention, the line shaft 8*c* and the drum shaft 9*c* of the draw-works of the rotary drilling apparatus, as well as the rotary 7*c*, are driven directly from a prime mover 66 by means of a chain drive of well known construction and embodying means and the combination of parts heretofore described in connection with the form of Fig. 1; that is to say, different speed means 11*c* and 12*c*, sprockets and clutch members on the respective shafts 8*c* and 9*c*, and chains connecting the sprockets.

For operating the independent control unit, I employ an independent low-powered prime mover indicated at 70. This prime mover is connected with the pump 16*c* of the hydraulic transmission through a chain drive 71 mounted on sprockets 72 and 73 respectively, carried on shafts 74 and 75 of the prime mover and the pump. In this form, 17*c* designates the transmission proper and 18*c* and 19*c* the suction and discharge pipes connecting the pump and the transmission 17*c*.

The governor device 24*c* in this instance is driven from the line shaft 8*c* through a chain 76 extending over sprockets 77 and 78, the former being fixedly mounted on shaft 8c and the latter on the governor shaft 79. The operative connection between the worm shaft 26c and the rack 25c is similar to the construction of the form of Fig. 2, and includes a jack shaft 51c having a sprocket 52c and a pinion 53c, a sprocket 54c on shaft 26c, and a chain 55c.

The driving connection between the hydraulic transmission 17c and the drum 13 in this form, consists of a sprocket 80 secured to the transmission shaft, a chain 81 and sprockets 82 and 83 freely rotatable on the shaft 8c and mounted on a common hub. A chain 84 connects the sprocket 83 with a sprocket 85 freely rotatable on the drum shaft 9c, said sprocket 85 being designed to rotate shaft 9c by means of a clutch member 86, for operating and regulating the drill bit feed in connection with the drum 13.

It will be understood from the foregoing that my invention contemplates the employment of a governor in connection with a hydraulic transmission for automatically controlling the feed of the drill by raising or lowering the line attached to the hoist drum and connected with the drill during the drilling operation. The prime mover for turning the rotary will operate at a fairly constant speed, providing the load on the drill pipe or drill remains constant; this speed, however, for example, will be decreased when the load on the drill rotated by the rotary is increased. This change of speed of the prime mover will be reflected in the governor, driven either from the shaft of the prime mover, the rotary shaft or, as illustrated, from a shaft of the draw-works. My construction is of such a character that it may be readily incorporated in or associated with the usual and well known types of rotary drilling apparatus.

What I claim is—

1. In a well drilling apparatus, the combination with a prime mover having a drive shaft, a rotary table, driving means between the prime mover and the table, a variable speed rotatable drum hoist mechanism, a drill stem suspended from the hoist mechanism and rotated by the table, and automatically operable means associated with the rotating and hoist mechanism including a hydraulic transmission mechanism having a shaft connected with the said drive shaft, means connecting the transmission mechanism and the hoist mechanism, and a governor for controlling the operation of the hydraulic transmission, said governor operatively connected with the drive shaft and actuated in accordance with the speed of rotation imparted to the drill stem.

2. In a well drilling apparaus, the combination with a single prime mover, a rotary table, driving means between the prime mover and the table, a drum hoist mechanism, a drill stem suspended from the hoist mechanism, a hydraulic transmission mechanism, means connecting the hydraulic transmission and the hoist mechanism operative to vary the feed of the drill stem through said hoist mechanism, and a governor for controlling the operation of the hydraulic transmission, said governor actuated in accordance with the speed of rotation of the table.

3. In a well drilling apparatus, a rotary table, means for rotating the table, a drum hoist mechanism, a drill stem suspended from the hoist mechanism, a hydraulic transmission mechanism, means connecting the hydraulic transmission and the hoist mechanism operable to automatically vary the rotative speed of the hoist mechanism, and a governor for controlling the operation of the hydraulic transmission, said governor responsive to variations in rotation of the drill stem due to changes of resistance encountered in drilling.

4. In a well drilling apparatus, the combination with a draw-works, including a line-shaft and a drum-shaft, of a drill stem carrying a bit supported from the drum-shaft, a prime mover for operating the shafts, a rotary table driven from the prime mover, and automatically operable means associated with the draw-works for governing the feed of the drill stem by regulating the weight on the bit including an hydraulic transmission mechanism, a ball governor for controlling the operation of the transmission mechanism, said governor operatively connected with the prime mover, and said transmission mechanism operatively connected with the drum-shaft.

5. In a well drilling apparatus the combination with a draw-works including a line-shaft and a drum-shaft, of a drill stem carrying a bit supported from the drum-shaft, a prime mover for operating the shafts, a rotary table driven from the prime mover, an hydraulic transmission mechanism including a pump having a shaft connected with the prime mover, a ball governor for controlling the operation of the hydraulic transmission, said governor operatively connected with the pump shaft, and said transmission mechanism operatively connected with the drum-shaft.

6. In a well drilling apparatus, the combination with a prime mover having a drive shaft, a rotary table, driving means between the prime mover and the table, a variable speed rotatable drum hoist mechanism, a drill stem suspended from the hoist mechanism and rotated by the table, and automatically operable means associated with the rotating and hoist mechanism including a transmission mechanism having a shaft connected with the said drive shaft, means connecting the transmission mechanism and the hoist mechanism, and a governor for controlling the operation of the transmission, said governor operatively connected with the drive shaft and actuated in accordance with the speed of rotation imparted to the drill stem.

7. In a well drilling apparatus, the combination with a single prime mover, a rotary table, driving means between the prime mover and the table, a drum hoist mechanism, a drill stem suspended from the hoist mechanism, a transmission mechanism, means connecting the transmission and the hoist mechanism operative to vary the feed of the drill stem through said hoist mechanism, and a governor for controlling the operation of the transmission, said governor actuated in accordance with the speed of rotation of the table.

8. In a well drilling apparatus, a rotary table, means for rotating the table, a drum hoist mechanism, a drill stem suspended from the hoist mechanism, a transmission mechanism, means connecting the transmission and the hoist mechanism operable to automatically vary the rotative speed of the hoist mechanism, and a governor for controlling the operation of the transmission, said governor responsive to variations in rotation of the drill stem due to changes of resistance encountered in drilling.

9. In a well drilling apparatus, the combination with a draw-works including a line-shaft and a drum-shaft, of a drill stem carrying a bit supported from the drum-shaft, a prime mover for operating the shafts, a rotary table driven from the prime mover, and automatically operable means associated with the draw-works for governing the feed of the drill stem by regulating the weight on the bit including a transmission mechanism, a ball governor for controlling the operation of the transmission mechanism, said governor operatively connected with the prime mover, and said transmission mechanism operatively connected with the drum-shaft.

10. In a well drilling apparatus, the combination with a draw-works including a line-shaft and a drum-shaft, of a drill stem carrying a bit supported from the drum-shaft, a prime mover for operating the shafts, a rotary table driven from the prime mover, a transmission mechanism including a pump having a shaft connected with the prime mover, a ball governor for controlling the operation of the transmission, said governor operatively connected with the pump shaft, and said transmission mechanism operatively connected with the drum-shaft.

11. In a well drilling apparatus, a rotary table, means for rotating the table, a drum hoist mechanism and drill stem suspended from the hoist mechanism, means for driving said drum hoist mechanism, and control means for said drum hoist mechanism to vary the speed of the latter and comprising a governor responsive to variations in rotation of said rotary table.

EDGAR E. GREVE.